(12) United States Patent
Matsuo et al.

(10) Patent No.: US 8,971,685 B2
(45) Date of Patent: Mar. 3, 2015

(54) MULTICORE FIBER

(71) Applicants: Fujikura Ltd., Tokyo (JP); National University Corporation Hokkaido University, Sapporo-shi, Hokkaido (JP)

(72) Inventors: Shoichiro Matsuo, Sakura (JP); Katsuhiro Takenaga, Sakura (JP); Kunimasa Saitoh, Sapporo (JP); Masanori Koshiba, Sapporo (JP)

(73) Assignees: Fujikura Ltd., Tokyo (JP); National University Corporation Hokkaido University, Sapporo-Shi (JP)

( * ) Notice: Subject to any disclaimer, the term of this patent is extended or adjusted under 35 U.S.C. 154(b) by 1 day.

(21) Appl. No.: 13/875,851

(22) Filed: May 2, 2013

(65) Prior Publication Data

US 2013/0243384 A1   Sep. 19, 2013

Related U.S. Application Data

(63) Continuation of application No. PCT/JP2011/075593, filed on Nov. 7, 2011.

(30) Foreign Application Priority Data

Nov. 8, 2010   (JP) ................. 2010-250237
Apr. 26, 2011   (JP) ................. 2011-098687

(51) Int. Cl.
  *G02B 6/02*   (2006.01)
  *G02B 6/036*   (2006.01)
(52) U.S. Cl.
  CPC .......... *G02B 6/02042* (2013.01); *G02B 6/0365* (2013.01)
  USPC .................................. 385/127; 385/126

(58) Field of Classification Search
  USPC ........................................... 385/123, 126, 127
  See application file for complete search history.

(56) References Cited

U.S. PATENT DOCUMENTS 8,285,094 B2 * 10/2012 Takenaga et al. ............. 385/100
8,406,595 B2 *  3/2013 Hayashi ........................ 385/126

(Continued)

FOREIGN PATENT DOCUMENTS

| JP | 2010-181641 A | 8/2010 |
|----|---------------|--------|
| WO | 2010/038863 A1 | 4/2010 |
| WO | 2010/082656 A1 | 7/2010 |

OTHER PUBLICATIONS

Yoko Arakawa et al., "Reduction of Crosstalk by Trench-Assisted Multi-Core Fiber", 2011 Nen, The Institute of Electronics, Information and Communication Engineers Sogo Taikai Koen Ronbunshu, tsushin 2, p. 311, Feb. 28, 2011, 5 pages (w English translation).
Tetsuya Hayashi et al., "Low-Crosstalk and Low-Loss Multi-Core Fiber Utilizing Fiber Bend", 2011 Nen, The Institute of Electronics, Information and Communication Engineers Sogo Taikai Koen Ronbunshu, tsushin 2, p. 312, Feb. 28, 2011, 5 pages (w English translation).

(Continued)

*Primary Examiner* — Hemang Sanghavi
(74) *Attorney, Agent, or Firm* — Westerman, Hattori, Daniels & Adrian, LLP

(57) ABSTRACT

A multicore fiber includes a plurality of core elements; and a clad surrounding an outer periphery surface of each of the core elements, and each of the core elements includes a core, a first clad surrounding the outer periphery surface of the core and a second clad surrounding an outer periphery surface of the first clad, and when a refractive index of the core is $n_1$, a refractive index of the first clad is $n_2$, a refractive index of the second clad is $n_3$ and a refractive index of the clad is $n_4$, all of $n_1 > n_2 > n_3$, $n_1 > n_4$ and $n_3 < n_4$ are satisfied.

6 Claims, 2 Drawing Sheets

(56) References Cited

U.S. PATENT DOCUMENTS

| | | | |
|---|---|---|---|
| 2002/0176677 A1* | 11/2002 | Kumar et al. | 385/126 |
| 2009/0060437 A1* | 3/2009 | Fini et al. | 385/127 |
| 2011/0052129 A1 | 3/2011 | Sasaoka | |
| 2011/0274398 A1* | 11/2011 | Fini et al. | 385/124 |
| 2013/0183016 A1* | 7/2013 | Imamura | 385/127 |
| 2013/0294737 A1* | 11/2013 | Dianov et al. | 385/127 |

OTHER PUBLICATIONS

International Search Report for PCT/JP2011/075593, mailing date of Nov. 29, 2011.

* cited by examiner

MULTICORE FIBER

TECHNICAL FIELD

The present invention relates to a multicore fiber and, more particularly, relates to a multicore fiber which can reduce crosstalk.

BACKGROUND ART

Currently, conventional optical fibers used for optical fiber communication systems adopt a structure in which an outer periphery of one core is surrounded by a clad, and information is transmitted on fibers with an optical signal confined in this core. Further, as the optical fiber communication systems spread, the amount of information to be transmitted is dramatically increasing in recent years. Following an increase in the amount of information to be transmitted, the optical fiber communication systems use several tens or several hundreds of multiple optical fibers to perform long-haul optical communication of a large volume.

It is known that, to reduce the number of optical fibers in such an optical fiber communication system, a plurality of signals are transmitted by means of lights propagating in respective cores using a multicore fiber in which outer peripheries of a plurality of cores are surrounded by one clad.

Following Non-Patent Document 1 discloses an example of such a multicore fiber. In this multicore fiber, a plurality of cores are arranged in one clad. Further, to reduce crosstalk between the respective cores, propagation constants of the respective cores are different from each other, and refractive indices of the respective cores are different from each other.

[Patent Document 1] International Publication No. WO2010/038863

SUMMARY OF INVENTION

Objects to be Achieved by the Invention

However, propagation constants of cores which are not different are good for the multicore fiber depending on use of the multicore fiber, and, even when the propagation constants of the cores are not different, a multicore fiber is demanded which can reduce crosstalk between cores.

It is therefore an object of the present invention to provide a multicore fiber which can reduce crosstalk between cores.

Means for Achieving the Objects

A multicore fiber according to the present invention has: a plurality of core elements; and a clad surrounding an outer periphery surface of each of the core elements, and each of the core elements has a core, a first clad surrounding the outer periphery surface of the core and a second clad surrounding an outer periphery surface of the first clad, and when a refractive index of the core is $n_1$, a refractive index of the first clad is $n_2$, a refractive index of the second clad is $n_3$ and a refractive index of the clad is $n_4$,
all of
$n_1 > n_2 > n_3$,
$n_1 > n_4$ and
$n_3 < n_4$
are satisfied.

In this multicore fiber, in each of the core elements, the cores are surrounded by a first clad which has the refractive index $n_2$ lower than the refractive indices $n_1$ of the cores, so that lights can propagate in the cores. Further, the first clad is surrounded by the second clad which has the refractive index $n_3$ lower than the refractive index $n_2$ of the first clad, and each of the core elements adopts a trench structure, so that lights propagating in the cores are firmly trapped in the cores. Furthermore, the refractive index $n_3$ of the second clad is lower than the refractive index $n_2$ of the first clad, so that lights are firmly trapped in the cores and an area of the first clad. Consequently, it is possible to prevent lights propagating in the respective cores from leaking outside the core elements. Hence, this multicore fiber can reduce crosstalk between cores.

Further, when a radius of the core is $r_1$ and a radius of an outer periphery of the first clad is $r_2$, $$2.0 \leq r_2/r_1 \leq 2.6$$

is preferably satisfied.

When $r_2/r_1$ is 2.0 or more, the cores and the first clad can suppress a power ratio of a basic mode of the first clad low and suppress fluctuation in characteristics such as a mode field diameter and chromatic dispersion low. Consequently, it is possible to further reduce crosstalk while keeping a large mode field diameter and effective area. Further, when $r_2/r_1$ is 2.6 or less, it is possible to reduce diameters of the core elements, and reduce inter-center pitches between adjacent cores.

In addition, effective digits in this description are based on an idea of a general standard, and, when a number which is one digit smaller than the disclosed numerical value is rounded off, is equal to the disclosed number in some cases. When, for example, the effective number is 2.0 or more, the effective number includes 1.95 and, when the effective number is 2.6 or less, the effective number includes 2.64.

Further, in the multicore fiber, when a width between outer periphery surfaces of second clads of the adjacent core elements is w, w is preferably 5 μm or more.

This multicore fiber can further reduce crosstalk between the respective cores.

Further, in the multicore fiber, when a pitch between centers of the cores of the adjacent core elements is Λ, $$0.18 \leq w/\Lambda \leq 0.47$$

is preferably satisfied.

This multicore fiber can further reduce crosstalk between the respective cores.

Further, in the multicore fiber, when a radius of an outer periphery of the first clad is $r_2$, and a mode field diameter in case that light having a wavelength of 1550 nm propagates in the core is MFD, $$0.89 \leq r_2/\mathrm{MFD} \leq 1.18$$

is preferably satisfied.

According to the relationship between the diameter of the first clad and the mode field diameter, $r_2$/MFD is 0.89 or more, so that it is possible to suppress a power ratio of the basic mode of the first clad low, and suppress fluctuation in characteristics such as the mode field diameter and wavelength dispersion low. Consequently, it is possible to further reduce crosstalk while keeping a large mode field diameter and effective area. Further, when $r_2$/MFD is 1.18 or less, it is possible to reduce diameters of the core elements, and reduce inter-center pitchs between adjacent cores.

Effect of the Invention

As described above, the present invention provides a multicore fiber which can reduce crosstalk between cores.

EMBODIMENT OF THE INVENTION

Figure 1A:
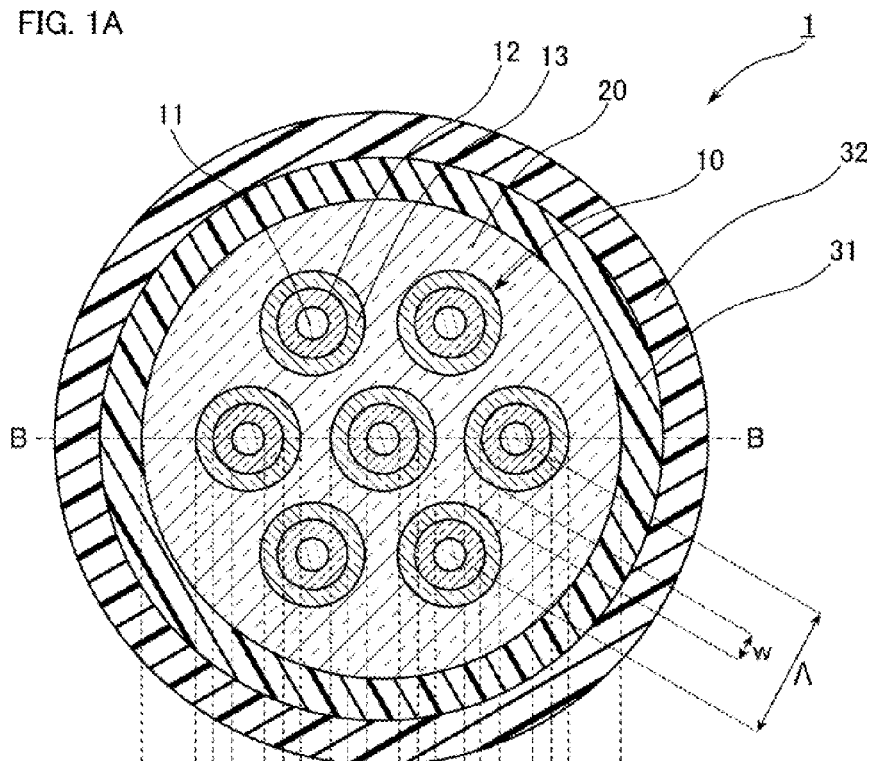
FIG. 1A-1B is a view illustrating a state of a multicore fiber according to an embodiment of the present invention.

A suitable embodiment of a multicore fiber according to the present invention will be explained in detail hereinafter referring to the drawings.

Figure 1B:
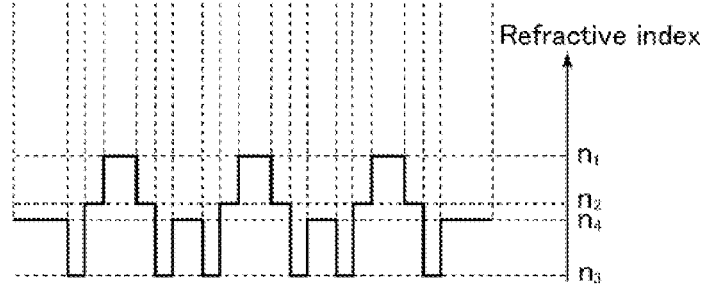

FIG. 1 is a view a state of the multicore fiber according to an embodiment of the present invention. More specifically, FIG. 1A is a view illustrating a state of a structure in a vertical cross-section of the multicore fiber according to the embodiment in a longitudinal direction and FIG. 1B is a view illustrating a refractive index distribution in a B-B line in FIG. 1A.

As illustrated in FIG. 1A, a multicore fiber 1 according to the embodiment has a plurality of core elements 10, a clad 20 which entirely surrounds a plurality of core elements 10 and fills between the respective core elements 10, and which surrounds outer periphery surfaces of the respective core elements 10, an inner protective layer 31 which covers the outer periphery surface of the clad 20 and an outer protective layer 32 which covers the outer periphery surface of the inner protective layer 31.

Each core element 10 has a core 11, a first clad 12 which surrounds an outer peripheral surface of the core 11 and a second clad 13 which surrounds an outer periphery surface of the first clad 12. With the embodiment, in each core element 10, the diameter of each core 11 (a radius $r_1$) is equal, an outer diameter of each first clad 12 (an outer periphery radius $r_2$) is equal and an outer diameter of each second clad (an outer periphery radius $r_3$) is equal. Hence, the thickness of each first clad 12 is equal, and, further, the thickness of each second clad 13 is equal. Further, although the size of each member forming the multicore fiber 1 is not limited in particular, in the embodiment, the diameter ($2r_1$) of the core 11 is 8.2 μm, an outer diameter ($2r_2$) of the first clad 12 is 19 μm, an outer diameter ($2r_3$) of the second clad 13 is 27 μm, a diameter of the clad 20 is 150 μm, an outer diameter of the inner protective layer 31 is 220 μm and an outer diameter of the outer protective layer 32 is 270 μm.

In the embodiment, the diameter of the core 11 and the outer diameter of the first clad 12 are as described above, and the radius $r_1$ of the core 11 and the outer periphery radius $r_2$ of the first clad 12 satisfy $2.0 < r_2/r_1 < 2.6$.

Further, as illustrated in FIG. 1B, a refractive index $n_2$ of the first clad 12 is lower than a refractive index $n_1$ of the core 11, and, further, a refractive index $n_3$ of the second clad 13 is lower than the refractive index $n_2$ of the first clad 12. Furthermore, a refractive index $n_4$ of the clad 20 is a refractive index between the refractive index $n_2$ of the first clad 12 and the refractive index $n_3$ of the second clad 13. In other words, the respective refractive indices $n_1$ to $n_4$ satisfy all of $n_1 > n_2 > n_3$,
$n_1 > n_4$ and
$n_3 < n_4$.

Thus, in terms of the refractive index of each core element 10, the second clad 13 has a trench shape, so that the core element 10 adopts a trench structure.

In addition, waveguide characteristics of an optical fiber are defined by a relative refractive index difference Δ of the above refractive index with respect to the refractive index of the clad 20. When i=1, 2, 3 is true, the relative refractive index difference $\Delta_i$ of a layer having the refractive index $n_i$ with respect to the clad 20 is defined according to the following equation.

$$\Delta_i = \frac{n_i^2 - n_4^2}{2n_i^2}$$

In addition, in FIG. 1B, the refractive indices of the inner protective layer 31 and the outer protective layer 32 are not illustrated.

Thus, the refractive index $n_3$ of the second clad 13 is lower than the refractive index $n_2$ of the first clad 12 and the refractive index $n_4$ of the clad 20, so that an effect of trapping light in the core 11 increases and it is possible to prevent light propagating in the core 11 from leaking from the core element 10. Further, the second clad 13 and the clad 20 having the low refractive indices serve as barriers, so that it is possible to prevent crosstalk between the adjacent cores 11.

The relative refractive index difference $\Delta_1$ of the core 11 is defined according to a mode field diameter MFD which needs to be provided as characteristics. Although a relative refractive index difference Δ2 of the first clad 12 with respect to the clad 20 is almost zero frequently, the relative refractive index difference Δ2 is adequately set to positive and negative values to adjust wavelength dispersion characteristics.

Hence, although the above refractive indices $n_1$ to $n_4$ are not limited in particular as long as the refractive indices $n_1$ to $n_4$ satisfy above all equations, in the embodiment, the refractive index $n_2$ of the first clad 12 is set between the refractive index $n_1$ of the core 11 and the refractive index $n_4$ of the clad 20 as illustrated in FIG. 1B. That is, the refractive index $n_2$ of the first clad 12 and the refractive index $\Delta_4$ of the clad 20 satisfy $n_2 > n_4$.

Further, in the trench-type core element 10, the radius $r_1$ of the core 11 and the outer periphery radius $r_2$ of the first clad 12 preferably satisfy $2.0 < r_2/r_1 < 2.6$ as described above. When $r_2/r_1$ is 2.0 or more, the core 11 and the first clad 12 can suppress a power ratio of the basic mode of the first clad 12 low and suppress fluctuation in characteristics such as the mode field diameter and wavelength dispersion low. Consequently, it is possible to further reduce crosstalk while keeping a large mode field diameter MFD and effective area Aeff. Further, when $r_2/r_1$ is 2.6 or less, it is possible to reduce the diameter of the core element 10, and reduce inter-center pitchs Λ between the adjacent cores 11.

In addition, in the embodiment, the refractive index $n_1$ of the core 11 in each core element 10 is equal, the refractive index $n_2$ of the first clad 12 in each core element 10 is equal, and the refractive index $n_3$ of the second clad 13 in each core element 10 is equal.

Further, the multicore fiber according to the embodiment has seven core elements 10 as illustrated in FIG. 1, and one core element is arranged in the center of the clad 20 and the center of the core 11 of this core element 10 and the center of the clad 20 match. Furthermore, the rest of core elements 10 are arranged on the outer periphery side of the clad 20 to surround the core element 10 arranged in this center. With the respective core elements 10 arranged on the outer periphery side of this clad 20, the centers of the respective cores 11 are arranged in virtually a concentric pattern, and intervals between the centers of the respective cores 11 are equal.

Further, an interval between the center of the core 11 of the core element 10 arranged in the center of the clad 20 and the center of the core 11 of each core element 10 arranged on the outer periphery side of the clad 20, and an interval between the centers of the cores 11 of the respective core elements 10 arranged on the outer periphery side of the clad 20 are virtually equal. Thus, the interval between the centers of the cores 11 of the adjacent core elements 10 are all equal. Hence, an interval between the outer periphery surfaces of the second clads 13 in the adjacent core elements 10 are also all equal.

Further, when the pitch between the centers of the adjacent cores 11 is Λ, the pitch Λ is preferably 30 μm or more from the view point of reducing crosstalk, and is preferably 50 μm or less from the view point of reducing the diameter of the clad 20. Furthermore, when the width between outer periphery surfaces of the adjacent second clads 13 is w, the width w is preferably larger than a wavelength of use from the view point of reducing crosstalk between the adjacent cores 11, and is preferably three times as the wavelength of use from the view point of further reducing this crosstalk. Still further, when the width w is 5 μm or more, the width w is preferably three times as a wavelength of 1500 nm which is normally used as a communication wavelength of a long wavelength to sufficiently reduce crosstalk upon normal communication.

Moreover, the pitch Λ and the width w preferably satisfy $$0.18 \leq w/\Lambda \leq 0.47$$

to further reduce crosstalk.

Although, in the embodiment, in each core element 10, the diameter of each core 11 is equal, the outer diameter of each first clad 12 is equal and an outer diameter of each second clad 13 is equal as described above, the thickness of the first clad 12 and the thickness of the second clad 13 may be adjusted.

In this multicore fiber 1, when light enters each core 11, the light propagates in each core 11. In this case, the light propagating in the core 11 propagates slightly spreading to an outside from the outer periphery surface of the core 11, and has a predetermined mode field MFD. Further, when the wavelength of light propagating in the core 11 is 1550 nm, this mode field diameter MFD and the radius r2 of the first clad 12 preferably satisfy $$0.89 \leq r_2/MFD \leq 1.88.$$

According to the relationship between the diameter of the first clad and the mode field diameter, $r_2$/MFD is 0.89 or more, so that it is possible to suppress a power ratio of the basic mode of the first clad 12 low, and suppress fluctuation in characteristics such as the mode field diameter MFD and wavelength dispersion low. Consequently, it is possible to further reduce crosstalk while keeping a large mode field diameter MFD and effective area Aeff. Further, when $r_2$/MFD is 1.18 or less, it is possible to reduce the diameter of the core element 10, and reduce the inter-center pitch between the adjacent cores.

As described above, in the multicore fiber 1 according to the embodiment, in each core element 10, the core 11 is surrounded by the first clad 12 having the refractive index $n_2$ lower than the refractive index $n_2$ of the core 11, so that light can propagate in the core 11. Further, the first clad 12 is surrounded by the second clad 13 having the refractive index $n_3$ lower than the refractive index $n_2$ of the first clad 12, so that light propagating in the core 11 is more firmly trapped in the core 11. Furthermore, the refractive index $n_4$ of the clad 20 is lower than the refractive index $n_2$ of the core 11, so that light is attracted more to the core 11 than to the clad 20. Consequently, it is possible to prevent light propagating in each core 11 from leaking outside the core element 10. Hence, this multicore fiber 1 can reduce crosstalk between the cores 11.

Although the present invention has been described above by reference to a certain embodiment as an example, the present invention is not limited thereto.

Figure 2:
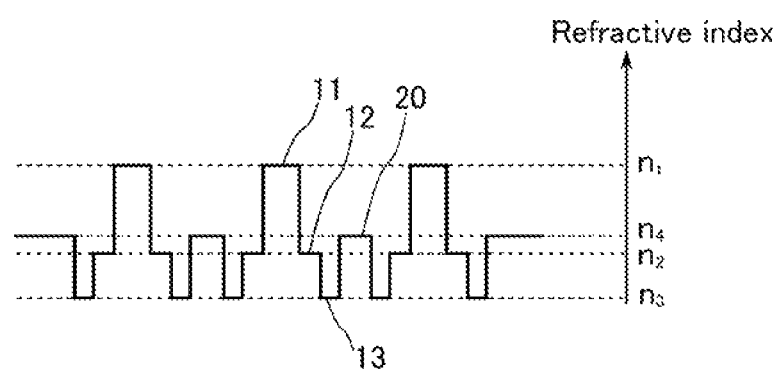
FIG. 2 is a view illustrating a modified example of a refractive index of a first clad in a multicore fiber.

Although, in the embodiment, as illustrated in FIG. 1B, the refractive index $n_2$ of the first clad 12 is set between the refractive index $n_1$ of the core 11 and the refractive index $n_4$ of the clad 20, the present invention is not limited thereto. FIG. 2 is a view illustrating a modified example of the refractive index of the first clad 12 in the multicore fiber 1. As illustrated in FIG. 2, the refractive index $n_2$ of the first clad 12 may be set between the refractive index $n_4$ of the clad 20 and the refractive index $n_3$ of the second clad 13. That is, the refractive index $n_2$ of the first clad 12 and the refractive index $\Delta_4$ of the clad 20 may satisfy $$n_2 < n_4.$$

In addition, in FIG. 2, 11 indicates a position corresponding to the core 11, 12 indicates a position corresponding to the first clad 12, 13 indicates a position corresponding to the second clad 13 and 20 indicates a position corresponding to the clad 20.

Further, although not illustrated, the refractive index $n_2$ of the first clad 12 and the refractive index $n_4$ of the clad 20 may be equal. That is, the refractive index $n_2$ of the first clad and the refractive index $n_4$ of the clad 20 may satisfy $$n_2 = n_4.$$

Further, although the number of core elements 10 is seven in the embodiment, the present invention is not limited thereto, and the number of core elements 10 may be seven or less or seven or more as long as the number of core elements 10 is plural. For example, the number of core elements may be three, and the twelve core elements 10 may be arranged on an outer periphery side of the core elements 10 arranged on the outer periphery side of the clad 20 in FIG. 1 as described above, and nineteen core elements may be arranged in a triangular grid, respectively. Further, the core elements 10 may be arranged in a grid in which, for example, the core elements 10 are aligned in four rows×five columns, or may be arranged with another alignment.

Furthermore, although the diameters (radii $r_1$) and the refractive indices $n_1$ of the cores 11 of the adjacent core elements 10 are equal in the embodiment, the present invention is not limited thereto, and at least one of the diameters (radii $r_1$) and the refractive indices $n_1$ of the cores 11 in the adjacent core elements 10 may be different from each other. In this case, it is possible to further reduce crosstalk.

Similarly, although the outer diameters $r_2$ and the refractive indices $n_2$ of the first clads 12 in the adjacent core elements 10, and the outer diameters $r_3$ and the refractive indices $n_3$ of the second clads 13 are equal, the present invention is not limited thereto, and one of the outer diameters $r_2$ and the refractive indices $n_2$ of the first clads 12 in the adjacent core elements 10, and the outer diameters $r_3$ and the refractive indices $n_3$ of the second clads 13 may be different. Also in this case, it is possible to further reduce crosstalk.

EXAMPLES

Hereinafter, although the present invention will be more concretely explained with examples and comparative examples, the present invention is not limited thereto.

Example 1

A simulation was conducted assuming a multicore fiber adopting the same structure as in the embodiment. In this simulation, the radius $r_1$ of a core in each core element was 4.1 μm, the outer periphery radius $r_2$ of the first clad was 9.59 μm and the outer periphery radius $r_3$ of the second clad was 13.28 μm. Hence, the ratio $r_2/r_1$ of the radius $r_1$ of the core and the outer periphery radius $r_2$ of the first clad was 2.34. Further, in each core element, the relative refractive index difference $\Delta_1$ of the core with respect to the clad was 0.36%, the relative refractive index difference $\Delta_2$ of the first clad with respect to the clad was 0.00% and the relative refractive index difference $\Delta_3$ of the second clad with respect to the clad was −0.70%. Furthermore, the pitch $\Lambda$ between the centers of the cores in the adjacent core elements was 40 μm, and the width w between the outer periphery surfaces of the adjacent second clads was 13.44 μm. Hence, the ratio $w/\Lambda$ of the width w and the pitch $\Lambda$ was 0.34. These conditions are illustrated in Table 1.

Next, in the assumed multicore fiber, the cutoff wavelength λc of the core arranged in the center of the clad and the cutoff wavelength λc of the core arranged on the outer periphery side of the clad were simulated. Further, when the wavelengths of lights propagating in the respective cores were 1.31 μm and 1.55 μm, the mode field diameter MFD and the effective area Aeff of the respective wavelengths were simulated. Furthermore, the ratio $r_2$/MFD of the mode field diameter MFD and the outer periphery radius $r_2$ of the first clad when the wavelength was 1.55 μm was calculated. Still further, the amount of crosstalk in case that multicore fibers of 100 km under the assumed conditions were used was simulated. These simulation results are illustrated in Table 2.

Comparative Example 1

A multicore fiber was assumed in which the same core as in Example 1 except that the radius $r_1$ was 4.0 μm and the relative refractive index difference $\Delta_1$ with respect to a clad was 0.4% was arranged in the same clad as in Example 1 similar to Example 1, and first clads and second clads were not arranged. These conditions are illustrated in Table 1.

Next, similar to Example 1, when, in the assumed multicore fiber, the cutoff wavelength of the core arranged in the center of the clad was λc, the cutoff wavelength of the core arranged on the outer periphery side of the clad was λc, and the wavelengths of lights were 1.31 μm and 1.55 μm, the mode field diameter MFD and the effective area Aeff of each wavelength were simulated. Further, the amount of crosstalk in case that multicore fibers of 100 km under the assumed conditions were used was simulated. These simulation results are illustrated in Table 2.

As illustrated in FIG. 2, a difference between the cutoff wavelengths λc of the core arranged in the center of the clad and the core arranged on the outer periphery side of the clad was not produced between the multicore fiber according to Example 1 and the multicore fiber according to Comparative Example 1. Further, when the wavelengths were 1.31 μm and 1.55 μm, little difference between the mode field diameter MFD and the effective area Aeff was produced between the multicore fiber according to Example 1 and the multicore fiber according to Comparative Example 1. Furthermore, although, as to the amount of crosstalk in case that the multicore fibers of 100 km were used, the multicore fiber according to Example 1 of the present invention brought a good result of −20 dB or less, the multicore fiber according to a conventional technique brought a result that the amount of crosstalk was −14 dB and was larger than that of the present invention.

Example 2

A multicore fiber was made under the same conditions as the conditions of the multicore fiber assumed in Example 1, and the radius $r_1$ of the core in each core element, the outer periphery radius $r_2$ of the first clad and the outer periphery radius $r_3$ of the second clad were measured. Further, based on a measurement result, the ratio $r_2/r_1$ of the radius $r_1$ of the core and the outer periphery radius $r_2$ of the first clad was calculated. Furthermore, in each core element, the relative refractive index difference $\Delta_1$ of the core with respect to the clad, the relative refractive index difference $\Delta_2$ of the first clad with respect to the clad and the relative refractive index difference $\Delta_3$ of the second clad with respect to the clad were measured. Still further, the pitch $\Lambda$ between the centers of the cores in the adjacent core elements and the width w between the outer periphery surfaces of the adjacent second clads were measured, and the ratio $w/\Lambda$ of the width w and the pitch $\Lambda$ was calculated. These results are illustrated in Table 1.

As illustrated in Table 1, parameters of fabricated multicore fibers such as the outer periphery radius $r_2$ of the first clad, the outer periphery radius $r_3$ of the second clad, the relative refractive index difference $\Delta_1$ of the core with respect to the clad, the relative refractive index difference $\Delta_3$ of the second clad with respect to the clad, the pitch $\Lambda$ between the centers of the cores in the adjacent core elements and the width between the outer periphery surfaces of the adjacent second clads were slightly different from the conditions set in Example 1.

Next, the cutoff wavelength of the fabricated multicore fiber were measured: the cutoff wavelength λc of the core arranged in the center of the clad, the cutoff wavelength λc of the cores arranged on the outer periphery side of the clad. Further, the mode field diameter MFD and the effective area Aeff at the wavelength of 1.31 μm and 1.55 μm were measured. Furthermore, the ratio $r_2$/MFD of the mode field diameter MFD and the outer periphery radius $r_2$ of the first clad when the wavelength was 1.55 μm were calculated. Still further, the 100-km crosstalk of the fabricated multicore fiber was measured. These results are illustrated in Table 2.

As illustrated in Table 2, the cutoff wavelengths λc of the core arranged in the center of the clad and the core arranged on the outer periphery side of the clad brought the same result as the simulation result according to Example 1. Further, when the wavelengths were 1.31 μm and 1.55 μm, the mode field diameter and the effective area brought a result which was not substantially different from the simulation result according to Example 1. Furthermore, 100-km crosstalk of the fiber showed the same result as the simulation result in Example 1.

Comparative Example 2

A multicore fiber was made under the same conditions as the conditions of the multicore fiber assumed in Comparative Example 1, and the radius $r_1$ of the core in each core element, the relative refractive index difference $\Delta_1$ of the core with respect to the clad and the pitch $\Lambda$ between the centers of the adjacent cores were measured. The results are illustrated in Table 1.

Next, the cutoff wavelength of the fabricated multicore fiber were measured: the cutoff wavelength λc of the core arranged in the center of the clad and the cutoff wavelength λc of the core arranged on the outer periphery side of the clad. Further, the mode field diameter MFD and the effective area Aeff at the wavelength of 1.31 μm and 1.55 μm were measured. Furthermore, 100-km crosstalk of the fabricated multicore fiber was measured. These results are illustrated in Table 2.

As illustrated in Table 2, a difference between the cutoff wavelengths λc of the core arranged in the center of the clad and the core arranged on the outer periphery side of the clad was not observed on fabricated multicore fibers shown as Example 2 and Comparative Example 2. Further, little difference between the mode field diameter MFD and the effective area Aeff at the wavelength of 1.31 µm and 1.55 µm of the fabricated multicore fibers shown as Example 2 and Comparative Example 2 showed similar values. 100-km crosstalk of the multicore fiber according to Example 2 of the present invention showed satisfactory value of −20 dB or less. However, the multicore fiber according to a conventional technique showed larger crosstalk of −14 dB.

Example 3

A multicore fiber was made such that the pitch Λ between the centers of the cores in the adjacent core elements and the width w between the outer periphery surfaces of the adjacent second clads were smaller than the multicore fiber made in Example 2. Further, the radius $r_1$ of the core in each core element, the outer periphery radius $r_2$ of the first clad and the outer periphery radius $r_3$ of the second clad were measured. Furthermore, based on a measurement result, the ratio $r_2/r_1$ of the radius $r_1$ of the core and the outer periphery radius $r_2$ of the first clad was calculated. Still further, in each core element, the relative refractive index difference $\Delta_1$ of the core with respect to the clad, the relative refractive index difference $\Delta_2$ of the first clad with respect to the clad and the relative refractive index difference $\Delta_3$ of the second clad with respect to the clad were measured. Moreover, the pitch Λ between the centers of the cores in the adjacent core elements and the width w between the outer periphery surfaces of the adjacent second clads were measured, and the ratio w/Λ of the width w and the pitch Λ was calculated. These results are illustrated in Table 1.

As illustrated in Table 1, fabricated multicore fiber of Example 3 has the same value in the radius $r_1$ of the core and the refractive index $\Delta_2$ of the first clad with the multicore fiber according to Example 2. However, the outer periphery radius $r_2$ of the first clad, the outer periphery radius $r_3$ of the second clad, the relative refractive index difference $\Delta_1$ of the core with respect to the clad and the relative refractive index difference $\Delta_3$ of the second clad with respect to the clad of Example 3 took values which were slightly difference from Example 2. Further, results of the pitch Λ between the centers of the cores in the adjacent core elements and the width w between the outer periphery surfaces of the adjacent second clads are as illustrated in Table 1.

Next, the cutoff wavelengths of the fabricated multicore fiber were measured: λc of the core arranged in the center of the clad and the cutoff wavelength λc of the core arranged on the outer periphery side of the clad. Further, the mode field diameter MFD and the effective area Aeff at the wavelength of 1.31 µm and 1.55 µm were measured. Furthermore, the ratio $r_2$/MFD of the mode field diameter MFD and the outer periphery radius $r_2$ of the first clad when the wavelength was 1.55 µm were calculated. Still further, the 100-km crosstalk of the fabricated multicore fiber was measured. These results are illustrated in Table 2 as Example 3.

As illustrated in Table 2, in the case of multicore fiber made in Example 3, although the cutoff wavelength λc of the core arranged on the outer periphery side of the clad took the same value as in Example 2, the cutoff wavelength λc of the core arranged in the center of the clad was 1390 nm which was a value greater than in the multicore fiber according to Example 2. This is because, when the width w was reduced, a wall was formed by the second clad of the core element arranged on the outer periphery side of the clad, so that a higher mode hardly escaped from the core element arranged in the center of the clad. The mode field diameter MFD and the effective area Aeff at the wavelength of 1.31 µm and 1.55 µm was larger than the measurement result according to Example 2. Furthermore, 100-km crosstalk was a good result of −25 dB which was greater than the measurement result according to Example 2.

Example 4

A multicore fiber was made such that the pitch Λ between the centers of the cores in the adjacent core elements was the same as in the multicore fiber made in Example 3, and the width w between the outer periphery surfaces of the adjacent second clads were small by adjusting the thicknesses of the first clad and the second clad. Further, the radius $r_1$ of the core, the outer periphery radius $r_2$ of the first clad and the outer periphery radius $r_3$ of the second clad of the made multicore fiber were measured. Furthermore, based on a measurement result, the ratio $r_2/r_1$ of the radius $r_1$ of the core and the outer periphery radius $r_2$ of the first clad was calculated. Still further, in each core element, the relative refractive index difference $\Delta_1$ of the core with respect to the clad, the relative refractive index difference $\Delta_2$ of the first clad with respect to the clad and the relative refractive index difference $\Delta_3$ of the second clad with respect to the clad were measured. Moreover, the pitch Λ between the centers of the cores in the adjacent core elements and the width w between the outer periphery surfaces of the adjacent second clads were measured, and the ratio w/Λ of the width w and the pitch Λ was calculated. These results are illustrated in Table 1.

As illustrated in Table 1, in the case of the made multicore fiber, although the refractive index $\Delta_2$ of the first clad was the same refractive index as the refractive index $\Delta_2$ of the first clad according to Example 3, the radius $r_1$ of the core, the relative refractive index difference $\Delta_1$ of the core with respect to the clad and the relative refractive index difference $\Delta_3$ of the second clad with respect to the clad took values which were slightly different from Example 3. Further, results of the outer periphery radius $r_2$ of the first clad, the outer periphery radius $r_3$ of the second clad, the pitch Λ between the centers of the cores in the adjacent core elements and the width w between the outer periphery surfaces of the adjacent second clads are as illustrated in Table 1.

Next, the cutoff wavelengths of the fabricated fibers were measured: the cutoff wavelength λc of the core arranged in the center of the clad and the cutoff wavelength λc of the core arranged on the outer periphery side of the clad. Further, he mode field diameter MFD and the effective area Aeff at the wavelength of 1.31 µm and 1.55 µm were measured. Furthermore, the ratio $r_2$/MFD of the mode field diameter MFD and the outer periphery radius $r_2$ of the first clad when the wavelength was 1.55 µm were calculated. Still further, 100-km crosstalk of the fabricated multicore fiber was measured. These results are illustrated in Table 2.

As illustrated in Table 2, in the case of the multicore fiber made in this Example, although the cutoff wavelength λc of the core arranged on the outer periphery side of the clad took a value which was not so different from Example 3, the cutoff wavelength λc of the core arranged in the center of the clad was 1530 nm which was a value longer than in the multicore fiber according to Example 3. This is because, when the width w was reduced more than in Example 3, a higher mode more hardly escaped from the core element arranged in the center of the clad. Further, the mode field diameter MFD and the effective area Aeff at the wavelength of 1.31 µm and 1.55 µm took values which were slightly smaller than the measurement result according to Example 2. This is because the thicknesses of the first clad and the second clad were larger than the multicore fiber according to Example 3, and a force to trap lights in the cores increased. Further, 100-km crosstalk of the fabricated multicore fibers brought a good result of −24 dB which was slightly greater than the measurement result according to Example 3.

Example 5

A simulation was conducted to realize a multicore fiber whose width w, which is a width between the outer periphery surfaces of the adjacent second clad, is smaller than that of Example 4 by adjusting the thicknesses of the first clad and the second clad, and making the pitch $\Lambda$ between the centers of the cores in the adjacent core elements smaller than the pitch $\Lambda$ of the multicore fiber made in Example 4. Further, the multicore fiber was designed such that the cutoff wavelength equal to or less than 1260 nm was provided even in the center core to guarantee single mode transmission in the band of 1300 nm. The parameters of this example are shown in Table 1.

As illustrated in Table 1, in the case of multicore fiber of this Example, the radius $r_1$ of the core, the outer periphery radius $r_2$ of the first clad, the outer periphery radius $r_3$ of the second clad, the pitch $\Lambda$ between the centers of the cores in the adjacent core elements and the width w between outer periphery surfaces of the adjacent second clads took values which were slightly different from the multicore fiber according to Example 4. This width w took a value which was smaller than the width w of the multicore fiber according to Example 4. Further, although the refractive index $\Delta_2$ of the first clad was the same refractive index as the refractive index $\Delta_2$ of the first clad according to Example 4, the relative refractive index difference $\Delta_1$ of the core with respect to the clad and the relative refractive index difference $\Delta_3$ of the second clad with respect to the clad took values which were slightly different from the multicore fiber according to Example 4.

Next, the cutoff wavelength $\lambda c$ of the core arranged in the center of the clad and the cutoff wavelength $\lambda c$ of the core arranged on the outer periphery side of the clad were simulated on this Example. Further, the mode field diameter MFD and the effective area Aeff at the wavelength of 1.31 μm and 1.55 μm were simulated. Furthermore, the ratio $r_2$/MFD of the mode field diameter MFD and the outer periphery radius $r_2$ of the first clad when the wavelength was 1.55 μm were calculated. Still further, the 100-km crosstalk of this example was simulated. These simulation results are summarized in Table 2.

As illustrated in Table 2, in the case of the multicore fiber of this this Example, the cutoff wavelength $\lambda c$ of the core arranged in the center of the clad was 1260 nm and the cutoff wavelength $\lambda c$ of the core arranged on the outer periphery side of the clad was 1170 nm. Thus, the cutoff wavelengths took values which were smaller than the multicore fiber according to Example 4, so that it is possible to provide characteristics that can guarantee transmission through all cores at the band of 1300 nm. A fiber with comparatively short cutoff wavelength is likely to be difficult to put optical fibers into practical use due to deterioration of macrobending loss. However, it is possible to secure practical bending loss even for a comparatively short cutoff wavelength by adopting a trench structure as in the present invention. Furthermore, the mode field diameter MFD and the effective area Aeff at the wavelength of 1.31 μm and 1.55 μm took values which were slightly smaller than the measurement result according to Example 2. Still further, the 100-km crosstalk of the fabricated multicore fiber brought a low crosstalk of −20 dB which was slightly greater than the measurement result according to Example 4.

Table 1 is illustrated below. Table 1 illustrates the size of each portion and conditions of refractive indices of the assumed multicore fibers, and measurement result of the size of each portion of the made multicore fibers.

TABLE 1

| | Example 1 | Comparative Example 1 | Example 2 | Comparative Example 2 | Example 3 | Example 4 | Example 5 |
|---|---|---|---|---|---|---|---|
| $r_1$ (μm) | 4.10 | 4.00 | 4.10 | 4.00 | 4.10 | 3.90 | 3.46 |
| $r_2$ (μm) | 9.59 | — | 8.90 | — | 9.59 | 10.25 | 8.64 |
| $r_3$ (μm) | 13.28 | — | 12.92 | — | 13.28 | 14.50 | 15.00 |
| $r_2/r_1$ | 2.34 | — | 2.17 | — | 2.34 | 2.63 | 2.50 |
| $\Delta_1$ (%) | 0.36 | 0.40 | 0.37 | 0.40 | 0.36 | 0.37 | 0.34 |
| $\Delta_2$ (%) | 0.00 | — | 0.00 | — | 0.00 | 0.00 | 0.00 |
| $\Delta_3$ (%) | −0.70 | — | −0.73 | — | −0.70 | −0.44 | −0.45 |
| $\Lambda$ (μm) | 40 | 40 | 38.3 | 39.4 | 35.4 | 35.4 | 35.0 |
| w (μm) | 13.44 | — | 12.47 | — | 8.83 | 6.20 | 5.00 |
| w/$\Lambda$ | 0.34 | — | 0.33 | — | 0.25 | 0.18 | 0.14 |

Table 2 is illustrated below. Table 2 illustrates simulation results of the assumed multicore fibers, and measurement results of the made multicore fibers.

TABLE 2

| | Example 1 | Comparative Example 1 | Example 2 | Comparative Example 2 | Example 3 | Example 4 | Example 5 |
|---|---|---|---|---|---|---|---|
| $\lambda c$: Center (nm) | 1260 | 1260 | 1260 | 1260 | 1390 | 1530 | 1260 |
| $\lambda c$: Outer periphery side (nm) | 1260 | 1260 | 1260 | 1260 | 1260 | 1250 | 1170 |
| MFD: 1.31 (μm) | 8.7 | 8.6 | 8.7 | 8.6 | 9.2 | 8.7 | 8.6 |
| MFD: 1.55 (μm) | 9.6 | 9.6 | 9.5 | 9.6 | 10.0 | 9.8 | 9.71 |
| $r_2$/MFD$_{1.55}$ | 1.00 | — | 0.94 | — | 0.96 | 1.05 | 0.89 |
| Aeff: 1.31 (μm$^2$) | 60.0 | 58.2 | 59.9 | 58.6 | 65.4 | 58.4 | 56.95 |

TABLE 2-continued

|  | Example 1 | Comparative Example 1 | Example 2 | Comparative Example 2 | Example 3 | Example 4 | Example 5 |
|---|---|---|---|---|---|---|---|
| Aeff: 1.55 (μm$^2$) | 71.0 | 71.0 | 70.7 | 71.6 | 76.4 | 72.9 | 71.6 |
| Crosstalk(dB) | −36 | −14 | −36 | −14 | −25 | −24 | −20 |

Example 6

Next, a simulation was conducted assuming a multicore fiber which can be used for an optical fiber for long-haul transmission such as submarine cables. In such an optical fiber, the effective area Aeff was about Aeff 110 μm$^2$ at the wavelength of 1550 nm. Sets of a plurality of radii $r_1$ of the core of the core element, outer periphery radii $r_2$ of the first clad, outer periphery radii $r_3$ of the second clad, relative refractive index differences $\Delta_1$ of the core with respect to the clad, relative refractive index differences $\Delta_2$ of the first clad with respect to the clad, the relative refractive index differences $\Delta_3$ of the second clad with respect to the clad, pitch Λ between centers of the cores in the adjacent core elements, and width w between the outer periphery surfaces of the adjacent second clads were determined to realize the Aeff of 110 μm$^2$ at 1550 nm, and multicore fibers with the sets were presented as 6-1 to 6-79. Further, the 100-km crosstalks of the multicore fibers were calculated.

This result is illustrated in from Table 3-1 to Table 3-3.

TABLE 3-1

|  | $r_1$ (μm) | $r_2$ (μm) | $r_3$ (μm) | $r_2/r_1$ | $\Delta_1$ (%) | $\Delta_2$ (%) | $\Delta_3$ (%) | Λ (μm) | w (μm) | Λ/w | λc (nm) | MFD 1.31 (μm) | MFD 1.55 (μm) | $r_2$/MFD$_{1.55}$ | Aeff 1.31 (μm$^2$) | Aeff 1.55 (μm$^2$) | Crosstalk (dB) |
|---|---|---|---|---|---|---|---|---|---|---|---|---|---|---|---|---|---|
| 6-1 | 5.50 | 11.00 | 14.21 | 2.00 | 0.25 | 0.00 | −0.65 | 40 | 11.57 | 0.29 | 1450 | 10.95 | 11.89 | 0.93 | 98.0 | 113.3 | −25 |
| 6-2 | 5.45 | 11.45 | 14.09 | 2.10 | 0.25 | 0.00 | −0.65 | 40 | 11.82 | 0.30 | 1450 | 10.95 | 11.95 | 0.96 | 97.5 | 113.6 | −20 |
| 6-3 | 5.41 | 10.82 | 17.34 | 2.00 | 0.24 | 0.00 | −0.65 | 45 | 10.31 | 0.23 | 1450 | 10.96 | 11.91 | 0.91 | 97.8 | 113.4 | −72 |
| 6-4 | 5.35 | 11.23 | 17.37 | 2.10 | 0.24 | 0.00 | −0.65 | 45 | 10.26 | 0.23 | 1450 | 10.96 | 11.96 | 0.94 | 97.2 | 113.6 | −68 |
| 6-5 | 5.30 | 11.65 | 17.41 | 2.20 | 0.24 | 0.00 | −0.65 | 45 | 10.17 | 0.23 | 1450 | 10.95 | 12.01 | 0.97 | 96.7 | 113.9 | −65 |
| 6-6 | 5.25 | 12.08 | 17.43 | 2.30 | 0.24 | 0.00 | −0.65 | 45 | 10.14 | 0.23 | 1450 | 10.94 | 12.05 | 1.00 | 96.2 | 114.0 | −61 |
| 6-7 | 5.21 | 12.51 | 17.45 | 2.40 | 0.24 | 0.00 | −0.65 | 45 | 10.10 | 0.22 | 1450 | 10.94 | 12.08 | 1.04 | 95.7 | 114.2 | −57 |
| 6-8 | 5.18 | 12.95 | 17.47 | 2.50 | 0.24 | 0.00 | −0.65 | 45 | 10.06 | 0.22 | 1450 | 10.93 | 12.12 | 1.07 | 95.4 | 114.4 | −53 |
| 6-9 | 5.50 | 11.01 | 16.23 | 2.00 | 0.25 | 0.00 | −0.65 | 45 | 12.54 | 0.28 | 1450 | 10.95 | 11.89 | 0.93 | 98.0 | 113.3 | −62 |
| 6-10 | 5.45 | 11.45 | 16.31 | 2.10 | 0.25 | 0.00 | −0.65 | 45 | 12.38 | 0.28 | 1450 | 10.94 | 11.94 | 0.96 | 97.5 | 113.5 | −59 |
| 6-11 | 5.41 | 11.91 | 16.35 | 2.20 | 0.25 | 0.00 | −0.65 | 45 | 12.30 | 0.27 | 1450 | 10.94 | 11.98 | 0.99 | 97.1 | 113.8 | −55 |
| 6-12 | 5.38 | 12.37 | 16.42 | 2.30 | 0.25 | 0.00 | −0.65 | 45 | 12.15 | 0.27 | 1450 | 10.94 | 12.02 | 1.03 | 96.8 | 114.0 | −51 |
| 6-13 | 5.35 | 12.84 | 16.47 | 2.40 | 0.25 | 0.00 | −0.65 | 45 | 12.05 | 0.27 | 1450 | 10.93 | 12.05 | 1.07 | 96.5 | 114.2 | −47 |
| 6-14 | 5.33 | 13.31 | 16.54 | 2.50 | 0.25 | 0.00 | −0.65 | 45 | 11.91 | 0.26 | 1450 | 10.93 | 12.08 | 1.10 | 96.2 | 114.4 | −44 |
| 6-15 | 5.59 | 11.18 | 14.93 | 2.00 | 0.26 | 0.00 | −0.65 | 45 | 15.13 | 0.34 | 1450 | 10.94 | 11.87 | 0.94 | 98.4 | 113.3 | −50 |
| 6-16 | 5.55 | 11.66 | 15.03 | 2.10 | 0.26 | 0.00 | −0.65 | 45 | 14.94 | 0.33 | 1450 | 10.94 | 11.92 | 0.98 | 98.0 | 113.5 | −47 |
| 6-17 | 5.52 | 12.14 | 15.20 | 2.20 | 0.26 | 0.00 | −0.65 | 45 | 14.59 | 0.32 | 1450 | 10.94 | 11.96 | 1.02 | 97.6 | 113.8 | −44 |
| 6-18 | 5.49 | 12.63 | 15.08 | 2.30 | 0.26 | 0.00 | −0.65 | 45 | 14.83 | 0.33 | 1450 | 10.93 | 11.99 | 1.05 | 97.3 | 113.9 | −39 |
| 6-19 | 5.47 | 13.13 | 15.28 | 2.40 | 0.26 | 0.00 | −0.65 | 45 | 14.45 | 0.32 | 1450 | 10.93 | 12.02 | 1.09 | 97.0 | 114.1 | −36 |
| 6-20 | 5.45 | 13.63 | 15.47 | 2.50 | 0.26 | 0.00 | −0.65 | 45 | 14.05 | 0.31 | 1450 | 10.92 | 12.04 | 1.13 | 96.8 | 114.2 | −33 |
| 6-21 | 5.67 | 11.35 | 13.32 | 2.00 | 0.27 | 0.00 | −0.65 | 45 | 18.35 | 0.41 | 1450 | 10.93 | 11.86 | 0.96 | 98.6 | 113.4 | −37 |
| 6-22 | 5.64 | 11.85 | 13.58 | 2.10 | 0.27 | 0.00 | −0.65 | 45 | 17.84 | 0.40 | 1450 | 10.93 | 11.91 | 0.99 | 98.3 | 113.7 | −34 |
| 6-23 | 5.62 | 12.35 | 13.87 | 2.20 | 0.27 | 0.00 | −0.65 | 45 | 17.26 | 0.38 | 1450 | 10.93 | 11.94 | 1.03 | 98.2 | 113.9 | −32 |
| 6-24 | 5.59 | 12.87 | 14.16 | 2.30 | 0.27 | 0.00 | −0.65 | 45 | 16.68 | 0.37 | 1450 | 10.92 | 11.97 | 1.08 | 97.7 | 113.9 | −30 |
| 6-25 | 5.58 | 13.39 | 14.56 | 2.40 | 0.27 | 0.00 | −0.65 | 45 | 15.87 | 0.35 | 1450 | 10.92 | 11.99 | 1.12 | 97.6 | 114.2 | −29 |
| 6-26 | 5.57 | 13.92 | 15.07 | 2.50 | 0.27 | 0.00 | −0.65 | 45 | 14.87 | 0.33 | 1450 | 10.92 | 12.00 | 1.16 | 97.5 | 114.3 | −29 |
| 6-27 | 5.75 | 11.50 | 11.89 | 2.00 | 0.28 | 0.00 | −0.65 | 45 | 21.22 | 0.47 | 1450 | 10.96 | 11.96 | 0.96 | 99.3 | 114.7 | −23 |

TABLE 3-2

|  | $r_1$ (μm) | $r_2$ (μm) | $r_3$ (μm) | $r_2/r_1$ | $\Delta_1$ (%) | $\Delta_2$ (%) | $\Delta_3$ (%) | Λ (μm) | w (μm) | Λ/w | λc (nm) | MFD 1.31 (μm) | MFD 1.55 (μm) | $r_2$/MFD$_{1.55}$ | Aeff 1.31 (μm$^2$) | Aeff 1.55 (μm$^2$) | Crosstalk (dB) |
|---|---|---|---|---|---|---|---|---|---|---|---|---|---|---|---|---|---|
| 6-28 | 5.73 | 12.02 | 12.44 | 2.10 | 0.28 | 0.00 | −0.65 | 45 | 20.12 | 0.45 | 1450 | 10.95 | 11.96 | 1.01 | 99.0 | 114.6 | −24 |
| 6-29 | 5.70 | 12.55 | 12.87 | 2.20 | 0.28 | 0.00 | −0.65 | 45 | 19.26 | 0.43 | 1450 | 10.93 | 11.97 | 1.05 | 98.5 | 114.5 | −23 |
| 6-30 | 5.69 | 13.09 | 13.47 | 2.30 | 0.28 | 0.00 | −0.65 | 45 | 18.06 | 0.40 | 1450 | 10.93 | 11.97 | 1.09 | 98.4 | 114.4 | −24 |
| 6-31 | 5.68 | 13.63 | 13.99 | 2.40 | 0.28 | 0.00 | −0.65 | 45 | 17.03 | 0.38 | 1450 | 10.92 | 11.98 | 1.14 | 98.2 | 114.4 | −23 |
| 6-32 | 5.67 | 14.17 | 14.53 | 2.50 | 0.28 | 0.00 | −0.65 | 45 | 15.93 | 0.35 | 1450 | 10.92 | 11.98 | 1.18 | 98.1 | 114.3 | −23 |
| 6-33 | 5.48 | 10.96 | 16.65 | 2.00 | 0.25 | 0.00 | −0.45 | 45 | 11.71 | 0.26 | 1450 | 10.95 | 11.93 | 0.92 | 97.9 | 113.6 | −53 |
| 6-34 | 5.43 | 11.41 | 16.72 | 2.10 | 0.25 | 0.00 | −0.45 | 45 | 11.55 | 0.26 | 1450 | 10.94 | 11.97 | 0.95 | 97.3 | 113.7 | −50 |
| 6-35 | 5.39 | 11.87 | 16.77 | 2.20 | 0.25 | 0.00 | −0.45 | 45 | 11.46 | 0.25 | 1450 | 10.94 | 12.01 | 0.99 | 96.9 | 113.9 | −48 |
| 6-36 | 5.36 | 12.34 | 16.81 | 2.30 | 0.25 | 0.00 | −0.45 | 45 | 11.39 | 0.25 | 1450 | 10.93 | 12.04 | 1.02 | 96.9 | 113.9 | −44 |
| 6-37 | 5.34 | 12.81 | 16.89 | 2.40 | 0.25 | 0.00 | −0.45 | 45 | 11.22 | 0.25 | 1450 | 10.93 | 12.07 | 1.06 | 96.3 | 114.3 | −42 |
| 6-38 | 5.32 | 13.29 | 17.18 | 2.50 | 0.25 | 0.00 | −0.45 | 45 | 10.65 | 0.24 | 1450 | 10.93 | 12.09 | 1.10 | 96.1 | 114.5 | −40 |
| 6-39 | 5.57 | 11.14 | 15.39 | 2.00 | 0.26 | 0.00 | −0.45 | 45 | 14.21 | 0.32 | 1450 | 10.94 | 11.90 | 0.94 | 96.1 | 113.5 | −45 |
| 6-40 | 5.53 | 11.62 | 15.53 | 2.10 | 0.26 | 0.00 | −0.45 | 45 | 13.95 | 0.31 | 1450 | 10.93 | 11.94 | 0.97 | 97.7 | 113.6 | −43 |
| 6-41 | 5.51 | 12.11 | 16.19 | 2.20 | 0.26 | 0.00 | −0.45 | 45 | 12.62 | 0.28 | 1450 | 10.94 | 11.98 | 1.01 | 97.5 | 114.0 | −44 |
| 6-42 | 5.48 | 12.61 | 15.54 | 2.30 | 0.26 | 0.00 | −0.45 | 45 | 13.93 | 0.31 | 1450 | 10.93 | 12.01 | 1.05 | 97.1 | 114.0 | −36 |
| 6-43 | 5.46 | 13.11 | 15.69 | 2.40 | 0.26 | 0.00 | −0.45 | 45 | 13.61 | 0.30 | 1450 | 10.92 | 12.03 | 1.09 | 96.9 | 114.2 | −34 |

TABLE 3-2-continued

| | r₁ (μm) | r₂ (μm) | r₃ (μm) | r₂/r₁ | Δ₁ (%) | Δ₂ (%) | Δ₃ (%) | Λ (μm) | w (μm) | Λ/w | λc (nm) | MFD 1.31 (μm) | MFD 1.55 (μm) | r₂/MFD₁.₅₅ | Aeff 1.31 (μm²) | Aeff 1.55 (μm²) | Crosstalk (dB) |
|---|---|---|---|---|---|---|---|---|---|---|---|---|---|---|---|---|---|
| 6-44 | 5.45 | 13.62 | 15.86 | 2.50 | 0.26 | 0.00 | −0.45 | 45 | 13.29 | 0.30 | 1450 | 10.92 | 12.05 | 1.13 | 96.8 | 114.4 | −31 |
| 6-45 | 5.66 | 11.32 | 13.79 | 2.00 | 0.27 | 0.00 | −0.45 | 45 | 17.42 | 0.39 | 1450 | 10.93 | 11.89 | 0.95 | 98.6 | 113.6 | −35 |
| 6-46 | 5.63 | 11.82 | 13.98 | 2.10 | 0.27 | 0.00 | −0.45 | 45 | 17.03 | 0.38 | 1450 | 10.93 | 11.92 | 0.99 | 98.2 | 113.8 | −33 |
| 6-47 | 5.61 | 12.33 | 14.23 | 2.20 | 0.27 | 0.00 | −0.45 | 45 | 16.54 | 0.37 | 1450 | 10.93 | 11.96 | 1.03 | 98.0 | 114.0 | −31 |
| 6-48 | 5.59 | 12.85 | 14.58 | 2.30 | 0.27 | 0.00 | −0.45 | 45 | 15.85 | 0.35 | 1450 | 10.93 | 11.98 | 1.07 | 97.8 | 114.1 | −30 |
| 6-49 | 5.57 | 13.38 | 14.95 | 2.40 | 0.27 | 0.00 | −0.45 | 45 | 15.09 | 0.34 | 1450 | 10.92 | 11.99 | 1.12 | 97.5 | 114.1 | −29 |
| 6-50 | 5.56 | 13.91 | 15.49 | 2.50 | 0.27 | 0.00 | −0.45 | 45 | 14.02 | 0.31 | 1450 | 10.91 | 12.00 | 1.16 | 97.3 | 114.2 | −29 |
| 6-51 | 5.74 | 11.48 | 12.17 | 2.00 | 0.28 | 0.00 | −0.45 | 45 | 20.65 | 0.46 | 1450 | 10.94 | 11.94 | 0.96 | 99.1 | 114.4 | −25 |
| 6-52 | 5.72 | 12.00 | 12.52 | 2.10 | 0.28 | 0.00 | −0.45 | 45 | 19.95 | 0.44 | 1450 | 10.94 | 11.96 | 1.00 | 98.9 | 114.6 | −23 |
| 6-53 | 5.70 | 12.53 | 13.08 | 2.20 | 0.28 | 0.00 | −0.45 | 45 | 18.84 | 0.42 | 1450 | 10.93 | 11.96 | 1.05 | 98.5 | 114.4 | −24 |

TABLE 3-3

| | r₁ (μm) | r₂ (μm) | r₃ (μm) | r₂/r₁ | Δ₁ (%) | Δ₂ (%) | Δ₃ (%) | Λ (μm) | w (μm) | Λ/w | λc (nm) | MFD 1.31 (μm) | MFD 1.55 (μm) | r₂/MFD₁.₅₅ | Aeff 1.31 (μm²) | Aeff 1.55 (μm²) | Crosstalk (dB) |
|---|---|---|---|---|---|---|---|---|---|---|---|---|---|---|---|---|---|
| 6-54 | 5.68 | 13.07 | 13.60 | 2.30 | 0.28 | 0.00 | −0.45 | 45 | 17.80 | 0.40 | 1450 | 10.92 | 11.96 | 1.09 | 98.2 | 114.2 | −23 |
| 6-55 | 5.67 | 13.62 | 14.13 | 2.40 | 0.28 | 0.00 | −0.45 | 45 | 16.73 | 0.37 | 1450 | 10.91 | 11.97 | 1.14 | 98.0 | 114.2 | −23 |
| 6-56 | 5.67 | 14.17 | 14.63 | 2.50 | 0.28 | 0.00 | −0.45 | 45 | 15.73 | 0.35 | 1450 | 10.92 | 11.98 | 1.18 | 98.1 | 114.3 | −23 |
| 6-57 | 5.45 | 10.90 | 17.23 | 2.00 | 0.25 | 0.00 | −0.30 | 45 | 10.54 | 0.23 | 1450 | 10.95 | 11.97 | 0.91 | 97.5 | 113.8 | −45 |
| 6-58 | 5.41 | 11.36 | 17.25 | 2.10 | 0.25 | 0.00 | −0.30 | 45 | 10.50 | 0.23 | 1450 | 10.95 | 12.01 | 0.95 | 97.1 | 114.0 | −43 |
| 6-59 | 5.37 | 11.82 | 17.30 | 2.20 | 0.25 | 0.00 | −0.30 | 45 | 10.40 | 0.23 | 1450 | 10.93 | 12.04 | 0.98 | 96.6 | 114.1 | −40 |
| 6-60 | 5.35 | 12.30 | 17.37 | 2.30 | 0.25 | 0.00 | −0.30 | 45 | 10.26 | 0.23 | 1450 | 10.94 | 12.07 | 1.02 | 96.5 | 114.3 | −38 |
| 6-61 | 5.30 | 13.26 | 17.34 | 2.50 | 0.25 | 0.00 | −0.30 | 45 | 10.31 | 0.23 | 1450 | 10.92 | 12.11 | 1.10 | 95.8 | 114.5 | −33 |
| 6-62 | 5.55 | 11.10 | 16.01 | 2.00 | 0.26 | 0.00 | −0.30 | 45 | 12.98 | 0.29 | 1450 | 10.94 | 11.94 | 0.93 | 97.9 | 113.7 | −40 |
| 6-63 | 5.52 | 11.58 | 16.34 | 2.10 | 0.26 | 0.00 | −0.30 | 45 | 12.32 | 0.27 | 1450 | 10.94 | 11.97 | 0.97 | 97.6 | 113.9 | −39 |
| 6-64 | 5.49 | 12.08 | 15.99 | 2.20 | 0.26 | 0.00 | −0.30 | 45 | 13.02 | 0.29 | 1450 | 10.93 | 12.00 | 1.01 | 97.3 | 114.0 | −35 |
| 6-65 | 5.47 | 12.58 | 16.08 | 2.30 | 0.26 | 0.00 | −0.30 | 45 | 12.84 | 0.29 | 1450 | 10.93 | 12.03 | 1.05 | 97.0 | 114.2 | −33 |
| 6-66 | 5.45 | 13.09 | 16.23 | 2.40 | 0.26 | 0.00 | −0.30 | 45 | 12.55 | 0.28 | 1450 | 10.92 | 12.04 | 1.09 | 96.8 | 114.3 | −31 |
| 6-67 | 5.44 | 13.60 | 16.39 | 2.50 | 0.26 | 0.00 | −0.30 | 45 | 12.22 | 0.27 | 1450 | 10.92 | 12.06 | 1.13 | 96.7 | 114.4 | −29 |
| 6-68 | 5.64 | 11.28 | 14.37 | 2.00 | 0.27 | 0.00 | −0.30 | 45 | 16.25 | 0.36 | 1450 | 10.93 | 11.91 | 0.95 | 98.3 | 113.7 | −33 |
| 6-69 | 5.61 | 11.79 | 14.53 | 2.10 | 0.27 | 0.00 | −0.30 | 45 | 15.94 | 0.35 | 1450 | 10.92 | 11.94 | 0.99 | 97.9 | 113.8 | −31 |
| 6-70 | 5.60 | 12.31 | 14.79 | 2.20 | 0.27 | 0.00 | −0.30 | 45 | 15.43 | 0.34 | 1450 | 10.93 | 11.97 | 1.03 | 97.9 | 114.1 | −30 |
| 6-71 | 5.58 | 12.83 | 15.18 | 2.30 | 0.27 | 0.00 | −0.30 | 45 | 14.64 | 0.33 | 1450 | 10.92 | 11.99 | 1.07 | 97.6 | 114.1 | −29 |
| 6-72 | 5.57 | 13.36 | 15.61 | 2.40 | 0.27 | 0.00 | −0.30 | 45 | 13.78 | 0.31 | 1450 | 10.92 | 12.00 | 1.11 | 97.5 | 114.2 | −29 |
| 6-73 | 5.56 | 13.90 | 16.23 | 2.50 | 0.27 | 0.00 | −0.30 | 45 | 12.54 | 0.28 | 1450 | 10.92 | 12.01 | 1.16 | 97.4 | 114.3 | −29 |
| 6-74 | 5.73 | 11.45 | 12.36 | 2.00 | 0.28 | 0.00 | −0.30 | 45 | 20.28 | 0.45 | 1450 | 10.94 | 11.94 | 0.96 | 98.9 | 114.4 | −24 |
| 6-75 | 5.70 | 11.98 | 12.78 | 2.10 | 0.28 | 0.00 | −0.30 | 45 | 19.44 | 0.43 | 1450 | 10.93 | 11.95 | 1.00 | 98.5 | 114.2 | −24 |
| 6-76 | 5.69 | 12.52 | 13.32 | 2.20 | 0.28 | 0.00 | −0.30 | 45 | 18.36 | 0.41 | 1450 | 10.92 | 11.96 | 1.05 | 98.3 | 114.3 | −24 |
| 6-77 | 5.68 | 13.06 | 13.83 | 2.30 | 0.28 | 0.00 | −0.30 | 45 | 17.33 | 0.39 | 1450 | 10.92 | 11.97 | 1.09 | 98.2 | 114.3 | −23 |
| 6-78 | 5.67 | 13.61 | 14.33 | 2.40 | 0.28 | 0.00 | −0.30 | 45 | 16.35 | 0.36 | 1450 | 10.92 | 11.97 | 1.14 | 98.0 | 114.2 | −23 |
| 6-79 | 5.66 | 14.16 | 14.87 | 2.50 | 0.28 | 0.00 | −0.30 | 45 | 15.27 | 0.34 | 1450 | 10.91 | 11.97 | 1.18 | 97.9 | 114.2 | −23 |

As illustrated in from Table 3-1 to Table 3-3, all assumed multicore fibers brought good results that crosstalk was smaller than −20 dB.

Example 7 to Example 10

Next, an optical fiber was assumed which adopted the same structure as in the embodiment and had a greater effective area Aeff than in Example 6. More specifically, the radius $r_1$ of the core of the core element, the outer periphery radius $r_2$ of the first clad, the outer periphery radius $r_3$ of the second clad, the relative refractive index difference $\Delta_1$ of the core with respect to the clad, the relative refractive index difference $\Delta_2$ of the first clad with respect to the clad, the relative refractive index difference $\Delta_3$ of the second clad with respect to the clad, the pitch Λ between the centers of the cores in the adjacent core elements and the width w between the outer periphery surfaces of the adjacent core elements were selected to realize multicore fibers with effective area Aeff of 130 μm² at the wavelength of 1.55 μm. These conditions are illustrated in Table 4.

TABLE 4

| | Example 7 | Example 8 | Example 9 | Example 10 | Comparative Example 3 | Comparative Example 4 |
|---|---|---|---|---|---|---|
| r₁ (μm) | 5.73 | 5.85 | 5.96 | 6.07 | 6.24 | 6.35 |
| r₂ (μm) | 11.43 | 11.70 | 11.92 | 12.13 | — | — |
| r₃ (μm) | 17.77 | 16.83 | 15.68 | 14.41 | — | — |
| r₂/r₁ | 2.00 | 2.00 | 2.00 | 2.00 | — | — |
| Δ₁ (%) | 0.20 | 0.21 | 0.22 | 0.23 | 0.26 | 0.27 |
| Δ₂ (%) | 0.00 | 0.00 | 0.00 | 0.00 | — | — |
| Δ₃ (%) | −0.65 | −0.65 | −0.65 | −0.65 | — | — |
| Λ (μm) | 45 | 45 | 45 | 45 | 45 | 45 |
| w (μm) | 9.46 | 11.33 | 13.65 | 16.18 | — | — |
| w/Λ | 0.21 | 0.25 | 0.30 | 0.36 | — | — |

As illustrated in Table 4, in the respective assumed multicore fibers according to Examples 7 to 10, the radius $r_1$ of the core became greater in order from Examples 7 to 10. Meanwhile, $r_2$ was adjusted such that ($r_2/r_1$) was the same. Further, The w/Λ was set to became greater in order from Examples 7 to 10 by setting the pitch Λ between the centers of the cores in the adjacent core elements to be equal and width w to become larger in order from Examples 7 to 10.

Comparative Example 3 and Comparative Example 4

Next, multicore fibers in which the first clads and the second clads were not arranged were assumed. The multicore fibers was were designed to be the same effective core area Aeff at the wavelength of 1.55 μm as the multicore fibers assumed in Examples 7 to 10. Accordingly, the radius $r_1$ of the core in each core element, the relative refractive index difference $\Delta_1$ of the core with respect to the clad and the pitch Λ between the centers of the cores in the adjacent core elements were assumed. These conditions are illustrated in above Table 4.

As illustrated in Table 4, the radius $r_1$ of the core in the multicore fiber according to Comparative Example 3 was larger than the radii $r_1$ of the cores in the multicore fibers according to Examples 7 to 10, and, further, the relative refractive index $\Delta_1$ of the core in the multicore fiber according to Comparative Example 3 took a value which was larger than the relative refractive index differences $\Delta_1$ of the cores in the multicore fibers according to Examples 7 to 10. Further, the inter-center pitch Λ between the adjacent cores was the same as in Examples 7 to 10. Furthermore, the radius $r_1$ of the core of the multicore fiber according to Comparative Example 4 was larger than the radius $r_1$ of the core of the multicore fiber according to Comparative Example 3, and, further, the relative refractive index $\Delta_1$ of the core in the multicore fiber according to Comparative Example 4 took a value which was larger than the relative refractive index difference $\Delta_1$ of the core in the multicore fiber according to Comparative Example 3.

Next, in the assumed multicore fibers according to Examples 7 to 10 and the multicore fibers according to Comparative Examples 3 and 4, the cutoff wavelength λc of the core arranged in the center of the clad and the cutoff wavelength λc of the core arranged on the outer periphery side of the clad were simulated. Further, the mode field diameter MFD at the wavelength of 1.31 μm and 1.55 μm was simulated, and ($r_2$/MFD) was calculated from this result when the wavelength was 1.55 μm. Furthermore, the effective area Aeff was simulated. Still further, the 100-km crosstalk was simulated.

These simulation results are illustrated in Table 5.

MFD) and, if ($r_2$/MFD) at the wavelength of 1.55 μm was smaller than 0.9 as in Example 7, crosstalk could result in being reduced significantly.

Example 11 to Example 14

Next, an optical fiber was assumed which adopted the same structure as the multicore fiber according to the embodiment and which had the effective area Aeff larger than in Examples 7 to 10. More specifically, a plurality of multicore fibers were assumed in which the effective area Aeff was about 150 μm² at the wavelength of 1.55 μm, accordingly, the radius $r_1$ of the core in each core element, the outer periphery radius $r_2$ of the first clad, the outer periphery radius $r_3$ of the second clad, the relative refractive index difference $\Delta_1$ of the core with respect to the clad, the relative refractive index difference $\Delta_2$ of the first clad with respect to the clad, the relative refractive index difference $\Delta_3$ of the second clad with respect to the clad, the pitch Λ between the centers of the cores in the adjacent core elements and the width w between the outer periphery surfaces of the adjacent second clads were assumed.

These conditions are illustrated in Table 6.

TABLE 6

|  | Example 11 | Example 12 | Example 13 | Example 14 | Comparative Example 5 | Comparative Example 6 |
|---|---|---|---|---|---|---|
| $r_1$ (μm) | 5.98 | 6.13 | 6.27 | 6.40 | 6.73 | 6.89 |
| $r_2$ (μm) | 11.96 | 12.25 | 12.54 | 12.81 | — | — |
| $r_3$ (μm) | 18.47 | 17.75 | 16.92 | 15.81 | — | — |
| $r_2/r_1$ | 2.00 | 2.00 | 2.00 | 2.00 | — | — |
| $\Delta_1$ (%) | 0.16 | 0.17 | 0.18 | 0.19 | 0.23 | 0.24 |
| $\Delta_2$ (%) | 0.00 | 0.00 | 0.00 | 0.00 | — | — |
| $\Delta_3$ (%) | −0.65 | −0.65 | −0.65 | −0.65 | — | — |
| Λ (μm) | 45 | 45 | 45 | 45 | 45 | 45 |
| w (μm) | 8.06 | 9.50 | 11.17 | 13.38 | — | — |
| w/Λ | 0.18 | 0.21 | 0.25 | 0.30 | — | — |

As illustrated in Table 6, in the assumed multicore fibers according to Examples 11 to 14, the radius $r_1$ of the core became greater in order from Examples 11 to 14. Meanwhile, in the assumed optical fibers according to Examples 11 to 14, the radius $r_2$ of the outer periphery of the first clad was adjusted such that ($r_2/r_1$) was the same as ($r_2/r_1$) of the mul-

TABLE 5

|  | Example 7 | Example 8 | Example 9 | Example 10 | Comparative Example 3 | Comparative Example 4 |
|---|---|---|---|---|---|---|
| λc: Center(nm) | 1450 | 1450 | 1450 | 1450 | 1466 | 1521 |
| λc: Outer periphery side(nm) | 1515 | 1433 | 1371 | 1366 | 1465 | 1523 |
| MFD: 1.31 (μm) | 11.82 | 11.82 | 11.82 | 11.83 | 11.80 | 11.81 |
| MFD: 1.55 (μm) | 12.82 | 12.81 | 12.80 | 12.80 | 12.89 | 12.84 |
| $r_2$/MFD$_{1.55}$ | 0.89 | 0.91 | 0.93 | 0.95 | — | — |
| Aeff: 1.31 (μm²) | 111.8 | 112.1 | 112.5 | 113.0 | 112.5 | 113.4 |
| Aeff: 1.55 (μm²) | 130.0 | 130.0 | 130.0 | 130.2 | 130.0 | 130.0 |
| Crosstalk(dB) | −47 | −40 | −32 | −24 | −12 | −15 |

As illustrated in Table 5, even when the effective area Aeff was large, the multicore fibers according to Examples 7 to 10 realized reduced crosstalk compared to the crosstalk of the multicore fibers according to Comparative Examples 3 and 4. Further, crosstalk was reduced following the decrease of ($r_2$/ ticore fibers according to Examples 7 to 10. Further, The w/Λ was set to be larger in order from Examples 11 to 14 by setting the pitch Λ between the centers of the adjacent cores to be equal to that of Examples 7 to 10 and width w to be larger in order from Example 11 to 14.

Comparative Example 5 and Comparative Example 6

Next, multicore fibers in which the first clads and the second clads were not arranged was assumed. The fibers had the same effective core area Aeff at the wavelength of 1.55 μm as the multicore fibers assumed in Examples 11 to 14. Accordingly, the radius $r_1$ of the core in each core element, the relative refractive index difference $\Delta_1$ of the core with respect to the clad and the pitch $\Lambda$ between the centers of the cores in the adjacent core elements were assumed. These conditions are illustrated in Table 6.

As illustrated in Table 6, the radius $r_1$ of the core in the multicore fiber according to Comparative Example 5 was larger than the radii $r_1$ of the cores in the multicore fibers according to Examples 7 to 10, and, further, the relative refractive index $\Delta_1$ of the core in the multicore fiber according to Comparative Example 5 took a value which was larger than the relative refractive index differences $\Delta_1$ of the cores in the multicore fibers according to Examples 7 to 10. Further, the inter-center pitch $\Lambda$ between the adjacent cores was the same as in Examples 11 to 14. Furthermore, the radius $r_1$ of the core in the multicore fiber according to Comparative Example 6 was larger than the radius $r_1$ of the core in the multicore fiber according to Comparative Example 5, and, further, the relative refractive index $\Delta_1$ of the core in the multicore fiber according to Comparative Example 6 took a value which was greater than the relative refractive index difference $\Delta_1$ of the core in the multicore fiber according to Comparative Example 5.

Next, in the assumed multicore fiber according to Examples 11 to 14 and the multicore fibers according to Comparative Examples 5 and 6, the cutoff wavelength $\lambda c$ of the core arranged in the center of the clad and the cutoff wavelength $\lambda c$ of the core arranged on the outer periphery side of the clad were simulated. Further, the mode field diameter MFD at the wavelength of 1.31 μm and 1.55 μm was simulated, and ($r_2$/MFD) was calculated from this result when the wavelength was 1.55 μm. Furthermore, the effective area Aeff was simulated. Still further, 100-km crosstalk used was simulated.

These simulation results are illustrated in Table 7.

refractive indices $\Delta_3$ of the second clads in the multicore fibers according to Examples 1 to 5.

In multicore fibers according to Example 15, Example 17 and Example 19, the radius $r_1$ of the core, the outer periphery radius $r_2$ of the first clad, the relative refractive index difference $\Delta_1$ of the core, the refractive index $\Delta_2$ of the first clad and the pitch $\Lambda$ between the centers of the cores between the adjacent cores took the same values as in the multicore fiber according to Example 4. Further, in the multicore fiber according to Example 15, the outer periphery radius $r_3$ of the second clad was smaller than the outer periphery radius $r_3$ of the second clad in the multicore fiber according to Example 4. That is, in the multicore fiber according to Example 15, the thickness of the second clad which had a low refractive index and formed a trench portion had a shape thinner than the multicore fiber than the multicore fiber according to Example 4. Further, in the multicore fiber according to Example 17, the outer periphery diameter $r_3$ of the second clad was set between the outer periphery radius $r_3$ of the second clad in the multicore fiber according to Example 4 and the outer periphery radius $r_3$ of the second clad in the multicore fiber according to Example 15. Furthermore, in the multicore fiber according to Example 19, the outer periphery radius $r_3$ of the second clad was set between the outer periphery radius $r_3$ of the second clad in the multicore fiber according to Example 4 and the outer periphery radius $r_3$ of the second clad in the multicore fiber according to Example 17. Also in the multicore fibers according to Example 17 and Example 19, the thickness of the second clad had a shape thinner than the multicore fiber according to Example 4 similar to the multicore fiber according to Example 15.

Further, in the multicore fibers according to Example 16 and Example 18, the radius $r_1$ of the core, the outer periphery radius $r_2$ of the first clad, the relative refractive index difference $\Delta_1$ of the core, the refractive index $\Delta_2$ of the first clad and the pitch $\Lambda$ between the centers of the cores between the adjacent cores took the same values as in the multicore fiber according to Example 3. Furthermore, in the multicore fiber according to Example 16, the outer periphery radius $r_3$ of the second clad was smaller than the outer periphery radius $r_3$ of the second clad in the multicore fiber according to Example 3.

TABLE 7

| | Example 11 | Example 12 | Example 13 | Example 14 | Comparative Example 5 | Comparative Example 6 |
|---|---|---|---|---|---|---|
| λc: Center(nm) | 1450 | 1450 | 1450 | 1450 | 1446 | 1530 |
| λc: Outer periphery side(nm) | 1523 | 1443 | 1370 | 1330 | 1447 | 1529 |
| MFD: 1.31 (μm) | 12.72 | 12.71 | 12.71 | 12.70 | 12.67 | 12.69 |
| MFD: 1.55 (μm) | 13.77 | 13.76 | 13.76 | 13.75 | 13.84 | 13.76 |
| $r_2$/MFD$_{1.55}$ | 0.87 | 0.89 | 0.91 | 0.93 | — | — |
| Aeff: 1.31 (μm²) | 128.8 | 129.1 | 129.5 | 130.0 | 130.0 | 131.4 |
| Aeff: 1.55 (μm²) | 150.0 | 150.0 | 150.0 | 150.1 | 150.0 | 150.0 |
| Crosstalk(dB) | −40 | −34 | −28 | −20 | −2 | −7 |

As illustrated in Table 7, even when the effective area Aeff was larger than in Examples 7 to 11, the multicore fibers according to Examples 11 to 14 realized reduced crosstalk compared to the multicore fibers according to Comparative Examples 5 and 6. Further, crosstalk was reduced following the decrease of ($r_2$/MFD).

Example 15 to Example 19

Next, multicore fibers which adopted the same structure as the multicore fiber according to the embodiment was assumed The fibers had the relative refractive index difference $\Delta_3$ of the second clad that was smaller than the relative That is, in the multicore fiber according to Example 16, the thickness of the second clad which had a low refractive index and formed a trench portion had a shape thinner than the multicore fiber than the multicore fiber according to Example 3. Further, in the multicore fiber according to Example 18, the outer periphery diameter $r_3$ of the second clad was set between the outer periphery radius $r_3$ of the second clad in the multicore fiber according to Example 3 and the outer periphery radius $r_3$ of the second clad in the multicore fiber according to Example 16. Also in the multicore fiber according to Example 18, the thickness of the second clad had a shape thinner than the multicore fiber according to Example 3 similar to the multicore fiber according to Example 16.

These conditions are illustrated in Table 8.

TABLE 8

|  | Example 15 | Example 16 | Example 17 | Example 18 | Example 19 |
|---|---|---|---|---|---|
| $r_1$ (μm) | 3.90 | 4.10 | 3.90 | 4.10 | 3.90 |
| $r_2$ (μm) | 10.25 | 9.59 | 10.25 | 9.59 | 10.25 |
| $r_3$ (μm) | 11.94 | 11.47 | 12.22 | 12.85 | 13.43 |
| $r_2/r_1$ | 2.63 | 2.34 | 2.63 | 2.34 | 2.63 |
| $\Delta_1$ (%) | 0.37 | 0.36 | 0.37 | 0.36 | 0.37 |
| $\Delta_2$ (%) | 0.00 | 0.00 | 0.00 | 0.00 | 0.00 |
| $\Delta_3$ (%) | −1.50 | −1.50 | −1.50 | −1.50 | −1.50 |
| $\Lambda$ (μm) | 35.4 | 35.4 | 35.4 | 35.4 | 35.4 |
| w (μm) | 11.52 | 12.45 | 10.96 | 9.70 | 8.53 |
| w/$\Lambda$ | 0.33 | 0.35 | 0.31 | 0.27 | 0.24 |

As illustrated in Table 8, in the multicore fiber according to Example 15, in proportion to the degree that the outer periphery radius $r_3$ of the second clad is smaller than the outer periphery radius $r_3$ of the second clad in the multicore fiber according to Example 4 as described above, the width w between the outer periphery surfaces of the adjacent second clads and w/$\Lambda$ were greater than the width w and w/$\Lambda$ in the multicore fiber according to Example 4. Further, in the multicore fiber according to Example 17, as described above, the outer periphery radius $r_3$ of the second clad was set between the outer periphery radius $r_3$ of the second clad in the multicore fiber according to Example 4 and the outer periphery radius $r_3$ of the second clad in the multicore fiber according to Example 15, so that the width w between the outer periphery surfaces of the adjacent second clads and w/$\Lambda$ were set between the width w and w/$\Lambda$ in the multicore fiber according to Example 4 and the width w and w/$\Lambda$ in the multicore fiber according to Example 15. Furthermore, in the multicore fiber according to Example 19, as described above, the outer periphery radius $r_3$ of the second clad was set between the outer periphery radius $r_3$ of the second clad in the multicore fiber according to Example 4 and the outer periphery radius $r_3$ of the second clad in the multicore fiber according to Example 17, so that the width w between the outer periphery surfaces of the adjacent second clads and w/$\Lambda$ were set between the width and w/$\Lambda$ in the multicore fiber according to Example 4 and the width w and w/$\Lambda$ in the multicore fiber according to Example 17.

Still further, in the multicore fiber according to Example 16, as described above, in proportion to the degree that the outer periphery radius $r_3$ of the second clad was smaller than the outer periphery radius $r_3$ of the second clad in the multicore fiber according to Example 3, the width w between the outer periphery surfaces of the adjacent second clads and w/$\Lambda$ were greater than the width w and w/$\Lambda$ in the multicore fiber according to Example 3. Moreover, in the multicore fiber according to Example 18, as described above, the outer periphery radius $r_3$ of the second clad was set between the outer periphery radius $r_3$ of the second clad in the multicore fiber according to Example 3 and the outer periphery radius $r_3$ of the second clad in the multicore fiber according to Example 15, so that the width between the outer periphery surfaces of the adjacent second clads and w/$\Lambda$ were set between the width w and w/$\Lambda$ in the multicore fiber according to Example 3 and the width w and w/$\Lambda$ in the multicore fiber according to Example 16.

Next, in the assumed multicore fibers according to Examples 15 to 19, the cutoff wavelength $\lambda c$ of the core arranged in the center of the clad and the cutoff wavelength $\lambda c$ of the core arranged on the outer periphery side of the clad were simulated. Further, the mode field diameter MFD at the wavelength of 1.31 μm and 1.55 μm was simulated, and ($r_2$/MFD) was calculated from this result when the wavelength was 1.55 μm. Furthermore, the effective area Aeff was simulated. Still further, 100-km crosstalk of the multicore fibers was simulated.

These simulation results are illustrated in Table 9.

TABLE 9

|  | Example 15 | Example 16 | Example 17 | Example 18 | Example 19 |
|---|---|---|---|---|---|
| $\lambda c$: Center(nm) | 1280 | 1300 | 1300 | 1380 | 1400 |
| $\lambda c$: Outer periphery side(nm) | 1203 | 1236 | 1217 | 1364 | 1357 |
| MFD: 1.31 (μm) | 8.65 | 8.80 | 8.65 | 8.80 | 8.65 |
| MFD: 1.55 (μm) | 9.70 | 9.71 | 9.69 | 9.71 | 9.69 |
| $r_2$/MFD 1.55 | 1.06 | 0.99 | 1.06 | 0.99 | 1.06 |
| Aeff: 1.31 (μm²) | 57.5 | 60.5 | 57.5 | 60.5 | 57.5 |
| Aeff: 1.55 (μm²) | 70.3 | 72.4 | 70.2 | 72.3 | 70.2 |
| Crosstalk(dB) | −21 | −23 | −25 | −40 | −40 |

As illustrated in Table 9, even though the second clad of the multicore fiber according to Example 15 was thinner than the multicore fiber according to Example 4, the relative refractive index difference $\Delta_3$ of the second clad was made smaller than the multicore fiber according to Example 4, resulting in no substantial difference from crosstalk in the multicore fiber according to Example 4. Further, crosstalk in the multicore fiber according to Example 17 was reduced more than crosstalk in the multicore fiber according to Example 15 and crosstalk in the multicore fiber according to Example 19 was reduced more than crosstalk in the multicore fiber according to Example 17.

Furthermore, even though the second clad of the multicore fiber according to Example 16 was thinner than the multicore fiber according to Example 3, the relative refractive index difference $\Delta_3$ of the second clad was made smaller than the multicore fiber according to Example 3, resulting in no substantial difference from crosstalk in the multicore fiber according to Example 3. Still further, crosstalk in the multicore fiber according to Example 18 resulted in being reduced more than crosstalk in the multicore fiber according to Example 16.

Example 20 to Example 22

Next, crosstalk change according to change of the relative refractive index difference $\Delta_2$ of the first clad changed was studied. A multicore fiber which was virtually the same as in Example 2 was assumed with example 20, a multicore fiber which had the relative refractive index $\Delta_2$ of the first clad lower than the multicore fiber according to Example 20 was assumed with Example 21, and a multicore fiber which had the relative refractive index difference $\Delta_2$ of the first clad greater than the multicore fiber according to Example 20 was assumed with Example 22.

These conditions are illustrated in Table 10.

TABLE 10

|  | Example 20 | Example 21 | Example 22 |
|---|---|---|---|
| $r_1$ (μm) | 4.10 | 4.10 | 4.10 |
| $r_2$ (μm) | 8.90 | 8.90 | 8.90 |
| $r_3$ (μm) | 12.92 | 12.92 | 12.92 |
| $r_2/r_1$ | 2.17 | 2.17 | 2.17 |
| $\Delta_1$ (%) | 0.37 | 0.37 | 0.37 |
| $\Delta_2$ (%) | 0.00 | −0.05 | 0.05 |

TABLE 10-continued

|  | Example 20 | Example 21 | Example 22 |
|---|---|---|---|
| $\Delta_3$ (%) | −0.73 | −0.73 | −0.73 |
| $\Lambda$ (μm) | 38.3 | 38.3 | 38.3 |
| w (μm) | 12.47 | 12.47 | 12.47 |
| w/$\Lambda$ | 0.33 | 0.33 | 0.33 |

Next, in the assumed multicore fibers according to Examples 20 and 21, the cutoff wavelength λc of the core arranged in the center of the clad and the cutoff wavelength λc of the core arranged on the outer periphery side of the clad were simulated. Further, the mode field diameter MFD at the wavelength of 1.31 μm and 1.55 μm was simulated, and ($r_2$/MFD) was calculated from this result when the wavelength was 1.55 μm. Furthermore, the effective area Aeff was simulated. Still further, 100-km crosstalk was simulated.

These simulation results are illustrated in Table 11.

TABLE 11

|  | Example 20 | Example 21 | Example 22 |
|---|---|---|---|
| λ c: Center(nm) | 1309 | 1243 | 1369 |
| λ c: Outer periphery side(nm) | 1283 | 1254 | 1334 |
| MFD: 1.31 (μm) | 8.70 | 8.42 | 9.03 |
| MFD: 1.55 (μm) | 9.57 | 9.25 | 9.94 |
| $r_2$/MFD$_{1.55}$ | 0.96 | 0.93 | 0.90 |
| Aeff: 1.31 (μm²) | 59.5 | 56.1 | 63.7 |
| Aeff: 1.55 (μm²) | 70.7 | 66.3 | 76.1 |
| Crosstalk(dB) | −38 | −39 | −37 |

As illustrated in Table 11, the multicore fiber according to Example 21 which had the minus relative refractive index difference $\Delta_2$ of the first clad (the multicore fiber which had the refractive index of the first clad lower than the refractive index of the clad), and the multicore fiber according to Example 22 which had the plus relative refractive index $\Delta_2$ of the first clad (the multicore fiber which had the refractive index of the first clad higher than the refractive index of the clad) resulted in maintaining virtually equal crosstalk and optical characteristics of the multicore fiber according to Example 20 which took zero as the relative refractive index difference $\Delta_2$ of the first clad (the multicore fiber in which the refractive index of the first clad and the refractive index of the clad were the same).

The above Examples showed that the multicore fiber according to the present invention can reduce crosstalk between cores.

INDUSTRIAL APPLICABILITY

As described above, the present invention provides a multicore fiber which can reduce crosstalk between cores.

DESCRIPTION OF REFERENCE NUMERALS

1 . . . multicore fiber
10 . . . core element
11 . . . core
12 . . . first clad
13 . . . second clad
20 . . . clad
31 . . . inner protective layer
32 . . . outer protective layer

The invention claimed is:

1. A multicore fiber comprising:
a plurality of core elements; and
a clad surrounding an outer periphery surface of each of the core elements, wherein
each of the core elements comprises a core, a first clad surrounding the outer periphery surface of the core and a second clad surrounding an outer periphery surface of the first clad, and
when a refractive index of the core is $n_1$, a refractive index of the first clad is $n_2$, a refractive index of the second clad is $n_3$ and a refractive index of the clad is $n_4$,
all of $n_1 > n_2 > n_3$,
$n_1 > n_4$,
$n_3 < n_4$ and
$n_2 > n_4$ are satisfied.

2. The multicore fiber according to claim 1, wherein, when a radius of the core is $r_1$ and a radius of an outer periphery of the first clad is $r_2$,
$2.0 \leq r_2/r_1 \leq 2.6$
is satisfied.

3. The multicore fiber according to claim 1, wherein, when a width between outer periphery surfaces of second clads of the adjacent core elements is w, w is 5 μm or more.

4. The multicore fiber according to claim 3, wherein, when a pitch between centers of the cores of the adjacent core elements is $\Lambda$,
$0.18 \leq w/\Lambda \leq 0.47$
is satisfied.

5. The multicore fiber according to claim 1, wherein, when a radius of an outer periphery of the first clad is $r_2$, and a mode field diameter in case that light comprising a wavelength of 1550 nm propagates in the core is MFD,
$0.89 \leq r_2/MFD \leq 1.18$
is satisfied.

6. A multicore fiber comprising:
a plurality of core elements; and
a clad surrounding an outer periphery surface of each of the core elements, wherein
each of the core elements comprises a core, a first clad surrounding the outer periphery surface of the core and a second clad surrounding an outer periphery surface of the first clad, and
when a refractive index of the core is $n_1$, a refractive index of the first clad is $n_2$, a refractive index of the second clad is $n_3$ and a refractive index of the clad is $n_4$,
all of $n_1 > n_2 > n_3$,
$n_1 > n_4$,
$n_3 < n_4$, and
$n_2 < n_4$
are satisfied.

* * * * *